(12) United States Patent
Berger et al.

(10) Patent No.: US 11,554,454 B2
(45) Date of Patent: *Jan. 17, 2023

(54) FIXING DEVICE, MACHINING HEAD, MACHINE TOOL AND METHOD FOR FIXING A WORKPIECE

(71) Applicant: Bystronic Laser AG, Niederonz (CH)

(72) Inventors: Michael Berger, Bern (CH); Markus Steinlin, Zürich (CH); Wilfried Liegard, Bern (CH)

(73) Assignee: Bystronic Laser AG, Niederönz (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/505,690

(22) Filed: Oct. 20, 2021

(65) Prior Publication Data
US 2022/0040807 A1    Feb. 10, 2022

Related U.S. Application Data

(62) Division of application No. 17/284,026, filed on Apr. 9, 2021.

(30) Foreign Application Priority Data

Oct. 10, 2018 (DE) .......................... 102018125085.1

(51) Int. Cl.
     *B23Q 3/08*      (2006.01)
     *B23Q 17/22*      (2006.01)
     *B23Q 11/00*      (2006.01)

(52) U.S. Cl.
     CPC .............. *B23Q 3/088* (2013.01); *B23Q 3/08* (2013.01); *B23Q 11/0046* (2013.01); *B23Q 17/22* (2013.01)

(58) Field of Classification Search
CPC ...... B23Q 3/088; B23Q 3/08; B23Q 11/0046; B23Q 11/005; B23Q 11/006; B23Q 17/22;
(Continued)

(56) References Cited

U.S. PATENT DOCUMENTS 3,617,141 A * 11/1971 Sullivan ................. B23Q 3/069
     408/35
5,087,156 A    2/1992 Kanaya et al.
(Continued)

FOREIGN PATENT DOCUMENTS

DE      202008014488 U1    3/2010
GB      2299772 A * 10/1996 ........... B25H 1/0064
WO    WO-2019170825 A1 * 9/2019 ............. B23B 35/00

OTHER PUBLICATIONS

DE 202008014488 U1 Machine Langauge Translation.
International Preliminary Examiner Report for PCT/EP2019/077240.

*Primary Examiner* — Chwen-Wei Su
(74) *Attorney, Agent, or Firm* — Jacob Eisenberg

(57) ABSTRACT

The present disclosure relates to a fixing device arranged to be fastened to a machining head such as a drill head. A machine tool for machining workpieces such as metal sheets at a machining point is also disclosed. The workpieces may be machined from a machining side. A fastening device is included and adapted for fastening the fixing device to the machining head. A fixing head is included and adapted for releasably, locally fixing the workpiece on its machining side and adjacent to the machining point. A controller is included and configured to control the fixing and releasing of the fixing head on a workpiece.

5 Claims, 3 Drawing Sheets

(58) Field of Classification Search
CPC ........... B23B 2260/118; B23B 2270/30; B23B 2270/62; B23B 31/307; Y10T 279/11
See application file for complete search history.

(56) References Cited

U.S. PATENT DOCUMENTS

| | | |
|---|---|---|
| 5,332,341 A | 7/1994 | Arai et al. |
| 2002/0104207 A1 | 8/2002 | Smith et al. |
| 2018/0250833 A1* | 9/2018 | Boria .................. B25J 15/0061 |

* cited by examiner

FIXING DEVICE, MACHINING HEAD, MACHINE TOOL AND METHOD FOR FIXING A WORKPIECE

CROSS REFERENCE TO RELATED APPLICATIONS

This application is a Divisional Patent application of U.S. application Ser. No. 17/284,026 and claims priority to German Patent Application DE 102018125085.1, filed on Oct. 10, 2018, both of which are hereby incorporated herein by reference.

BACKGROUND OF THE INVENTION

The invention relates to a fixing device, a machining head, a machine tool for machining workpieces, in particular metal sheets and thin-walled workpieces, for example, such as pipes, and a method for fixing a workpiece.

In the machining of workpieces, in particular thin workpieces—among other things—both the fixing of the workpieces and the removal of machining residues such as shavings are important.

In combination machines or punching machines, a retractable matrix arranged below the workpiece is often used. This system makes it possible to keep the workpiece in a stable and known position. However, this system is time-consuming. It is also known to press the workpiece from above onto a counter-bearing which is located below the workpiece. This variant is also time-consuming.

The most common solution for evacuating machining residues, for example such as shavings, is the cooling/lubrication system. Shavings are transported with the liquid into a container where they are separated from the liquid by a filter or other solution. Furthermore, the chips can be removed with a brush when the position of the table changes. In this solution, there is a risk that the surface might be scratched. This solution is therefore only suitable for thick steel sheets on which surface scratches are not relevant.

U.S. Pat. Nos. 5,332,341 A and 5,087,156 A disclose a printed circuit board drilling apparatus including a pressure foot supported on a spindle and a pressing of a printed circuit board at the time of drilling operation. The pressure foot includes an end bush adapted to attract a support plate made of aluminium by vacuum. The support plate is provided for preventing generation of burrs and contributes to preventing the cooling fluid from remaining on the printed circuit board.

DE 202008014488 U1 discloses a processing machine including a pressing device and a workpiece receiving surface mounted on the machine stand for receiving a workpiece. The workpiece receiving surface includes a suction device to pick up and, if necessary, hold a picked-up workpiece by means of negative pressure. In this way, a holding force can be generated which acts in addition to the adhesive force between the workpiece and the workpiece mounting surface and thus holds the workpiece in position against slipping by the pressing device.

US 2002/104207 A1 discloses an apparatus for countersinking and rivet shaving including a pressure foot portion which is moved forwardly along with the spindle and drill to clamp the mechanical assembly. The workpiece is pressed by the pressure foot portion against a backup pad.

BRIEF SUMMARY OF THE INVENTION

The object of the invention is to avoid the disadvantages of the prior art and to improve the quality when machining workpieces. Alternative objects include providing an improved fixing device, an improved machining head, an improved machine tool, or an improved method of machining workpieces.

The fixing device according to the invention is arranged for fastening to a machining head, in particular a drill head, of a machine tool for machining workpieces, in particular metal sheets at a machining point, wherein the workpieces are machined from a machining side, and comprises:

a fastening device adapted for fastening the fixing device to the machining head;

a fixing head adapted for releasably, locally fixing the workpiece on its machining side and adjacent to the machining point by exerting a holding force which is directed to the fixing device and to the machining head; and a controller configured to control the fixing and releasing of the fixing head on a workpiece.

The fixing device according to the invention proposes that the fixing takes place from the machining side of the workpiece, i.e., from the side facing the fixing device or the machining head. In this way, the underside of the workpiece in the machining area can remain free of fixing devices, so that the machining can be carried out undisturbed by other holding elements while a good fixing of the workpiece is still achieved.

The workpiece is fixed by the fixing device regardless of the support on the underside of the workpiece. It can be provided that the fixing device or the fixing head exerts a holding force on the workpiece, which acts in the direction of the machining head or the fixing device. In other words, this holding force can counteract the machining direction of the tool. It can be provided that the fixing of the machining side of the workpiece in the machining area is carried out exclusively by the holding head.

Fixing adjacent to the machining point prevents a deformation of the workpiece from occurring adjacent to or in the vicinity of the machining site. Arranged as adjacent to or in the vicinity here is understood to mean a radial range or distance of 0.5 centimetres to ten centimetres around the machining point. The machining point or the machining site is the point of machining on the machining side of the workpiece or, in other words, the intersection of the machining axis with the workpiece. The size of the radial region can vary depending on the inherent rigidity of the material or the workpiece. The thinner the material, the smaller the radial area and the thicker or stiffer the material, the larger the radial area.

Workpieces here are generally considered to be metal sheets and thin-walled workpieces such as pipes, for example.

The fixing device according to the invention has the advantage that, even with thin workpieces, an automatic counter-hold to the forces acting during the machining is generated in the direction of the workpiece. This counterpoint is generated locally, i.e., around the location of the machining. Local deformation during machining in the area of the machining site is advantageously counteracted by the fixing device, which fixes the workpiece adjacent to the machining site. Overall, the workpiece is supported by a support structure of the machine tool. The invention produces a stable positioning of the workpiece relative to the tool, for example, such as a drill. In other words, an evasive movement of the workpiece in the Z direction is avoided. This allows a more accurate machining and reduces the wear on the tool.

In preferred embodiments, the fixing head is adapted for applying an attractive force to the machining side of the workpiece to fix the workpiece with its machining side at the fixing head. Such attractive force, like for example a vacuum or a magnetic force, pulls the workpiece towards the fixing head. The attractive force has a direction opposite to the direction of a machining force of the machining head. The fixing head could be named attractive force fixing head.

It can be provided that the fixing head has at least one controllable vacuum holder arranged for generating a vacuum holding force on the machining side of the workpiece. Vacuum holders operate quickly and reliably; in addition, non-metallic workpieces can be fixed or held. Advantageously, the vacuum holder can at least partially surround the machining site or alternatively, a plurality of vacuum holders can be provided, which are arranged radially circumferentially but adjacent to the machining site or to the machining tool. When machining on an edge of the workpiece, it can be provided that only individual vacuum holders facing away from the edge are activated, i.e., those which are in overlap with the workpiece.

It can further be provided that the fixing head has at least one controllable magnet arranged for generating a magnetic holding force on the machining side of the workpiece. Electromagnets can develop a high holding power. When machining on an edge of the workpiece, it can be provided that only individual electromagnets facing away from the edge are activated, i.e., those which are in overlap with the workpiece.

It can be provided that a suction and/or extracting device is provided for dirt and/or residues that arise during machining. Vacuum shavings which are produced during the machining process are extracted directly. Thus, the shavings are kept in a confined space and extracted. Optionally, a movable, for example telescoping, collar can be provided, which surrounds the tool and produces a closed or at least almost closed machining space. Immediate extraction eliminates the risk of scratches from the movement of the shavings on the surface or between two surfaces in storage. The extracting device can be operated with compressed air and/or with vacuum.

It can further be provided that the extracting device has a plurality of compressed air inlets distributed around a central machining axis for producing a circulating air flow around the central machining axis and at least one air outlet. Preferably, the direction of rotation of the circulating air flow corresponds to the direction of rotation of the drill. Such a circulating air flow allows a good removal of shavings.

It can be provided that at least one injection nozzle for lubricant and/or coolant is provided. The quality and speed of machining can be increased. The injection nozzle can be aligned with the tool or the machining location on the workpiece.

It can further be provided that a sensor is provided for detecting the presence of a tool and/or for detecting the position of the machining side of the workpiece. For example, a light barrier sensor can be integrated to monitor the presence of a tool. If the sensor is coupled to the Z-axis, the length of the tool can be measured and thus the length of this tool can be monitored. This or another sensor can also determine the top of the workpiece, which can be used to control the machining. Knowing the top position results in better Z-axis accuracy for processes such as drilling, countersinking, and tapping.

It can be provided that the controller is arranged to control the fixing head based on an input signal which indicates the start and/or the end of the machining. An automatic control of the fixing head in the machining cycle can increase the efficiency.

It can also be provided that an adjustable counter-bearing is provided on the fixing head, which is movable on an edge of the workpiece with a moving device to bear against the side facing away from the machining side of the workpiece. Usually, support elements such as rollers are located under the workpiece to hold it in position for machining. If now machined, for example, drilled, adjacent to an edge, this would possibly damage or destroy the rollers. The adjustable counter-bearing can be moved under the edge of the workpiece, after the support element(s) have been removed at least in the machining area, to hold it from below and laterally at the edge and so locally provide a counter-bearing. This means that machining operations can be performed directly on the edge of a workpiece when vacuum holders are not all activated.

The machining head according to the invention, in particular a drill head, of a machine tool for machining workpieces, wherein the workpieces can be machined from a machining side, includes a fixing device fastened to the machining head as described above. The same advantages and modifications apply as described above.

The machine tool according to the invention for machining workpieces, wherein the workpieces can be machined from a machining side, comprises a machining head as described above. The same advantages and modifications apply as described above.

The method according to the invention for fixing a workpiece during machining by a machining head, in particular a drill head, of a machine tool, wherein the workpieces are machined from a machining side at a machining point, comprises the steps:

fixing the workpiece relative to the machining head on the machining side of the workpiece and adjacent to the machining point, by means of a fixing device, in particular a fixing device as described above, when a control command is given wherein the fixing is realized by exerting a holding force which is directed to the fixing device and to the machining head;

machining of the workpiece at the machining point by the machining head; and release the workpiece when a control command is given.

The method can be carried out on the previously described machine tool, the machining head and/or the fixing device. Otherwise, the same advantages and modifications apply as described above.

It can be provided that the fixing device applies an attractive force to the machining side of the workpiece to fix the workpiece with its machining side at the fixing head. Such attractive force, like for example a vacuum or a magnetic force, pulls the workpiece towards the fixing device. The attractive force has a direction opposite to the direction of a machining force of the machining head. The fixing device could be named attractive force fixing device.

It can be provided that at least before the activation of the fixing device and the fixing of the workpiece, any dirt present thereon is extracted or blown away. This has the advantage that the fixing device finds a clean surface so as to ensure good adhesion.

It can be provided that machining residues which arise at least during machining are extracted and/or lubricant and/or coolant are injected. The quality and speed of machining can be increased. The injection nozzle can be aligned with the tool or the machining location on the workpiece.

It can also be provided that the presence of a tool is detected by means of a sensor. For example, a light barrier sensor can be integrated to control the presence of a tool. If the sensor is coupled to the Z-axis, the length of the tool can be measured and thus the length of this tool can be monitored. In addition, the sensor signal can be used to start the fixing process.

Further advantages, features and details of the present disclosure result from the following description of preferred embodiments and drawings. The characteristics and combinations of features mentioned above in the description, as well as the characteristics and combinations of features listed below in the description of figures and/or shown in the figures alone, are not limited to the combination indicated in each case; but can also be used in other combinations or on their own without leaving the scope of the invention.

BRIEF DESCRIPTION OF THE SEVERAL VIEWS OF THE DRAWINGS

Further advantages features and details of the various embodiments of this disclosure will become apparent from the ensuing description of a preferred exemplary embodiment or embodiments and further with the aid of the drawings. The features and combinations of features recited below in the description, as well as the features and feature combination shown after that in the drawing description or in the drawings alone, may be used not only in the particular combination recited but also in other combinations on their own without departing from the scope of the disclosure.

The invention will be explained below in exemplary embodiments with reference to the accompanying drawings. In the figures.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of "A, B, and C" should be understood as including only one of A, only one of B, only one of C, or any combination of A, B, and C.

Figure 1:
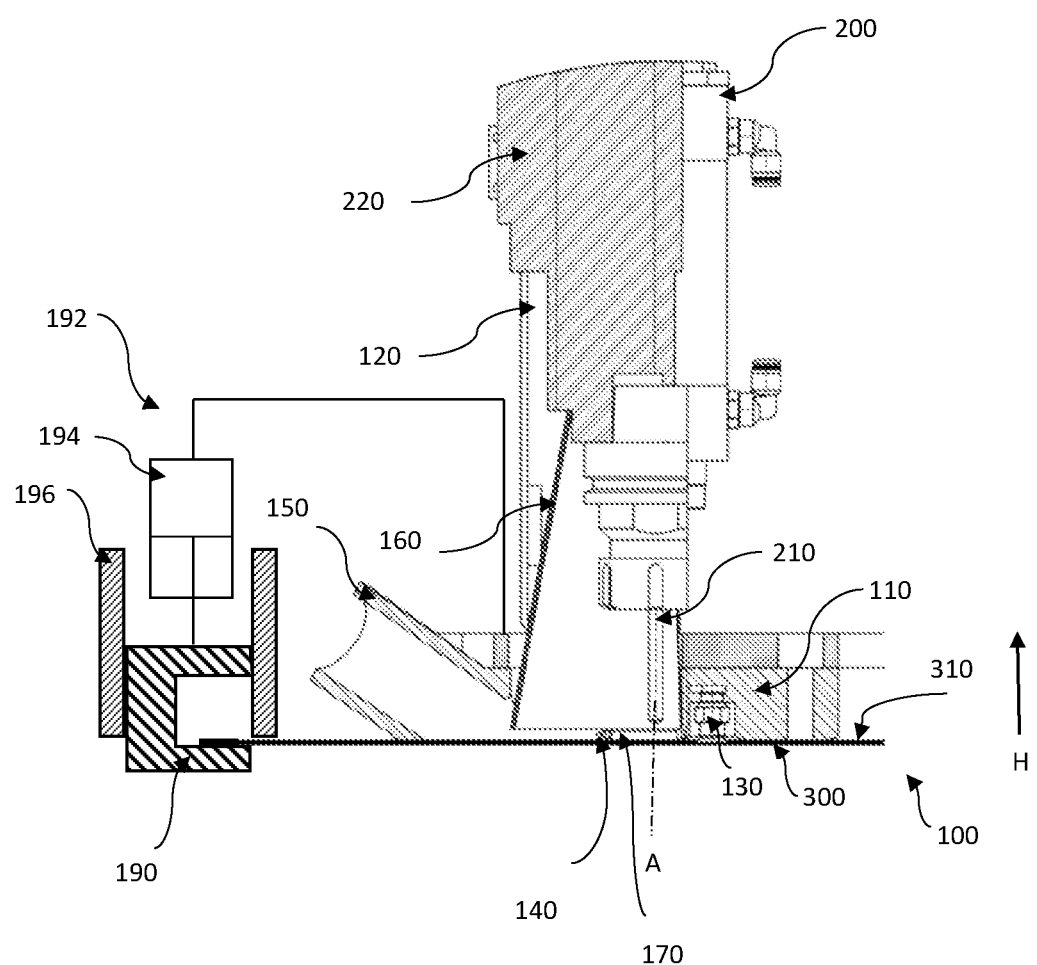
FIG. 1 depicts a schematic side view in partial section of a machining head and a fixing device.

FIG. 1 shows a schematic side view in partial section of a fixing device 100, which is fastened to a machining head 200 for machining a workpiece 300, here in the form of a metal sheet.

The machining head 200 is designed here as a drill head with a drill 210. The drill 210 is fastened to a spindle 220 which is movable along the Z axis, i.e., vertically. The machining head 200 is arranged here above the workpiece 300. Thus, the drill 210 can machine the workpiece 300 from a machining side 310, which in this example corresponds to the top of the workpiece 300.

The fixing device 100 comprises a fixing head 110, which is fastened to the machining head 200 by means of a fastening device 120. The fixing head 110 is used for releasable, local fixing of the workpiece 300 on the machining side 310 of the workpiece 300.

The fixing is achieved by a holding force H, which is directed upwards here, i.e., to the fixing device 100 and to the machining head 200. Thus, a fixing can be independent of the other support of the workpiece 300. Pressing frictional forces can therefore be dispensed with. Rather, an attractive force, such as a vacuum or a magnet is used.

For fixing the workpiece 300, the fixing device 100 comprises a vacuum suctioning device 130, which is designed here in the form of a suction cup or comprises a plurality of suction cups. A controller, not shown here, controls the fixing and releasing of the fixing head 110 by corresponding actuation of the vacuum holder 130. The vacuum holder 130 is used for locally fixing the workpiece 300 in the region of a machining axis A of the machining head 200. Depending on the thickness of the workpiece, this area has a radius of 0.5 to ten centimetres around a machining point which lies at the intersection of the machining axis A with the workpiece 300. This fixing counteracts the force which is applied by the tool, here in the form of the drill 210, to the machining side 310 of the workpiece 300.

In addition to the main function of fixing, the fixing device 100 or the fixing head 110 can comprise further functions. For example, a suctioning and/or extracting device can be provided with at least one compressed air inlet 140 to remove dirt and/or residues resulting from machining, for example such as shavings, from the machining side 310 of the workpiece 300. The shavings carried along with the air are removed via an air outlet 150. In addition, a collar 160 can be provided which shields the machining space and around the drill 210, so that the air and the shavings are carried away only through the air outlet 150. The collar 160 can be flexible or telescopically movable to accommodate the movement of the spindle 220 in the Z direction.

Furthermore, a sensor 170 can be provided for detecting the presence of a tool. This sensor is designed as a photoelectric barrier in this example. Thus, among other things, with a known position along the Z axis, the length of the tool, here the drill 210, can be determined. For example, the wear can be determined, or the positioning accuracy can be increased.

Furthermore, an adjustable or movable counter-bearing 190 can be provided on the fixing head 110, which can be moved on an edge of the workpiece 300 with a movement device 192 to bear on the side of the workpiece 300 facing away from the machining side 310. The counter-bearing 190 can include a metal profile or an angle. The movement device 192 can include a cylinder 194, with which the counter-bearing 190 is movable in the Z direction. In this case, the counter-bearing 190 in a guide 196 can be movable, e.g., liftable, as shown in FIG. 1. When the counter-bearing 190 is not used, it is retracted into the guide 196 to ensure maximum freedom of movement of the fixing head 110 or of the machining head 200.

The counter-bearing 190 and the moving device 192 are shown only schematically. Both elements are arranged on the fixing head 110 and therefore move together therewith or with the machining head 200.

Optionally, the moving device 192 can include a pivot unit (not shown) with which the counter-bearing 190 can at least partially move or pivot the workpiece 300 under, i.e., opposite the machining side 310. In the absence of further support from below, the counter-bearing 190 then serves as a counter-bearing in this area and supports the fixing by the at least one vacuum holder 130. The workpiece 300 at least partially rests on a leg of the counter-bearing 190.

Figure 2:
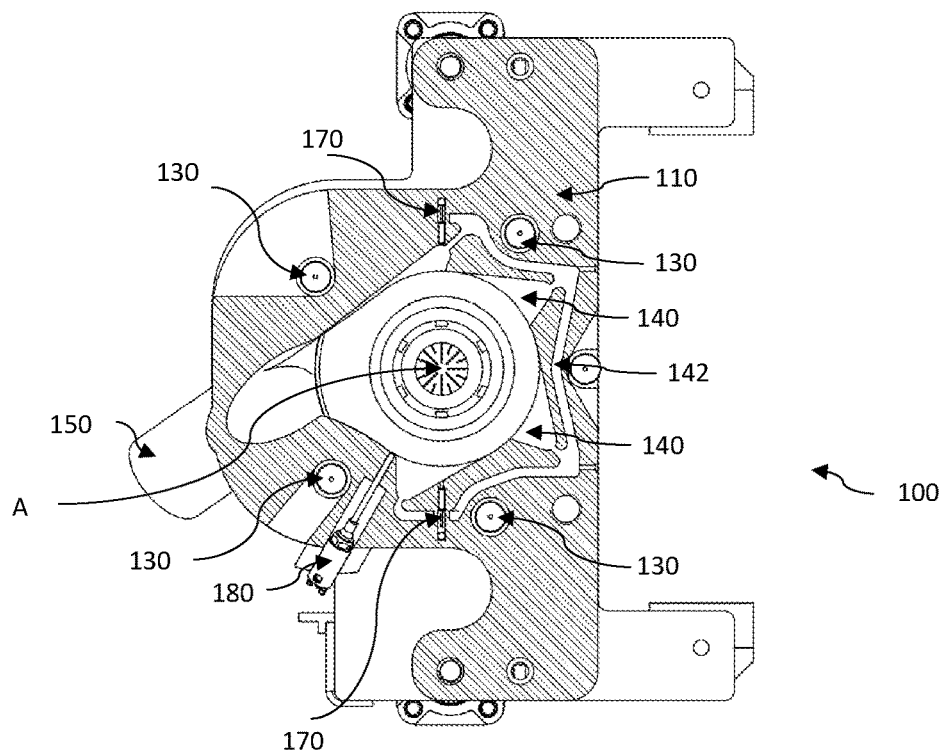
FIG. 2 depicts a schematic bottom view in partial section of a fixing device.

FIG. 2 shows a view from below in a partial sectional view of the fixing device 100 with the fixing head 110. It can be seen that in this embodiment a plurality of vacuum holders 130, here in the form of suction cups, are arranged distributed around the machining axis A.

A plurality of compressed air inlets 140 are distributed around the central machining axis. These compressed air inlets 140 are arranged such that they generate an airflow L circulating around the central machining axis A in the direction of the air outlet 150. In addition, the compressed air inlets 140 can be formed to be funnel-shaped, wherein the opening angle of the funnel is greater in the direction of the air flow L to be generated. Ideally, the air flow L circulates in the direction of the rotational movement of the tool. The compressed air inlets 140 are connected to each other via an air channel 142, via which the compressed air is supplied.

The sensor 170, which is designed here as light barriers which are arranged diametrically to each other with respect to the central machining axis A. This ensures that the tool is reliably detected whilst approaching the machining side 310 of the workpiece 300.

Furthermore, the fixing head 110 or the fixing device 100 comprises an injection nozzle 180 with which lubricant and/or coolant for the tool can be injected in the direction of the central machining axis A. In this way, among other things, the wear on the tool can be minimised and the quality of the machining can be increased.

Figure 3:
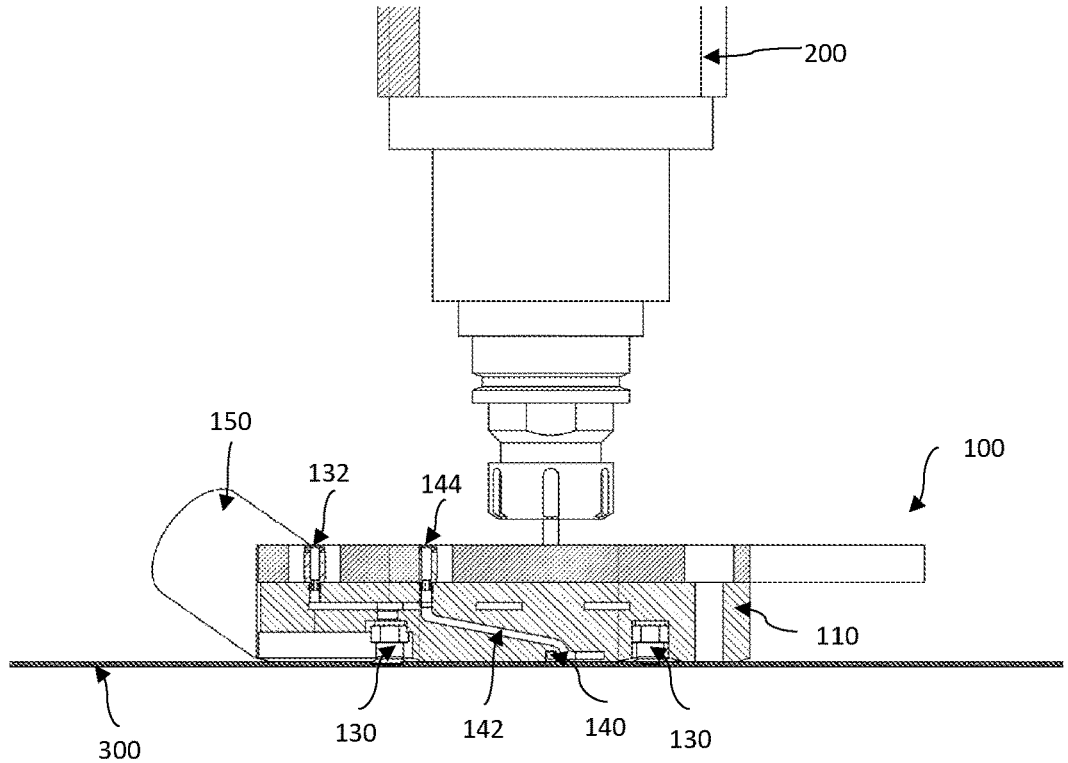
FIG. 3 depicts a further schematic side view in partial section of a machining head and a fixing device.

FIG. 3 shows a further schematic side view in partial section of the fixing device 100 with the fixing head 110, which is fastened to the machining head 200 for machining the workpiece 300. For reasons of clarity, the fastening device for fastening the fixing device 100 to the machining head 200 is not shown here.

The two vacuum holders 130 are activated and accordingly fix the machining side 310 in position relative to the machining head 200. Via a vacuum connection 132, which is in communication with the two vacuum holders 130, the vacuum is built up in the two vacuum holders 130.

The compressed air inlet 140 is connected via the air channel 142 with a compressed air connection 144. Both the vacuum port 132 and the compressed air port 144 can be connected to corresponding ports of the machining head 200. The air outlet 150 can also be connected to 100 via a corresponding hose, for example. In this way, the fixing head 110 is not only fastened to the machining head 200 but is also completely supplied with power thereby. Likewise, the power supply for the fixing head 110 can originate from the machining head 200. The power supply can be provided for example for the supply of the sensor 170, the injection nozzle 180, the operation of possibly provided valves for the vacuum and/or the compressed air as well as for the controller. This allows the fixing device 100 to be formed integrally with the machining head 200. Thus, the fixing device 100 can be easily moved with the machining head 200.

Figure 4:
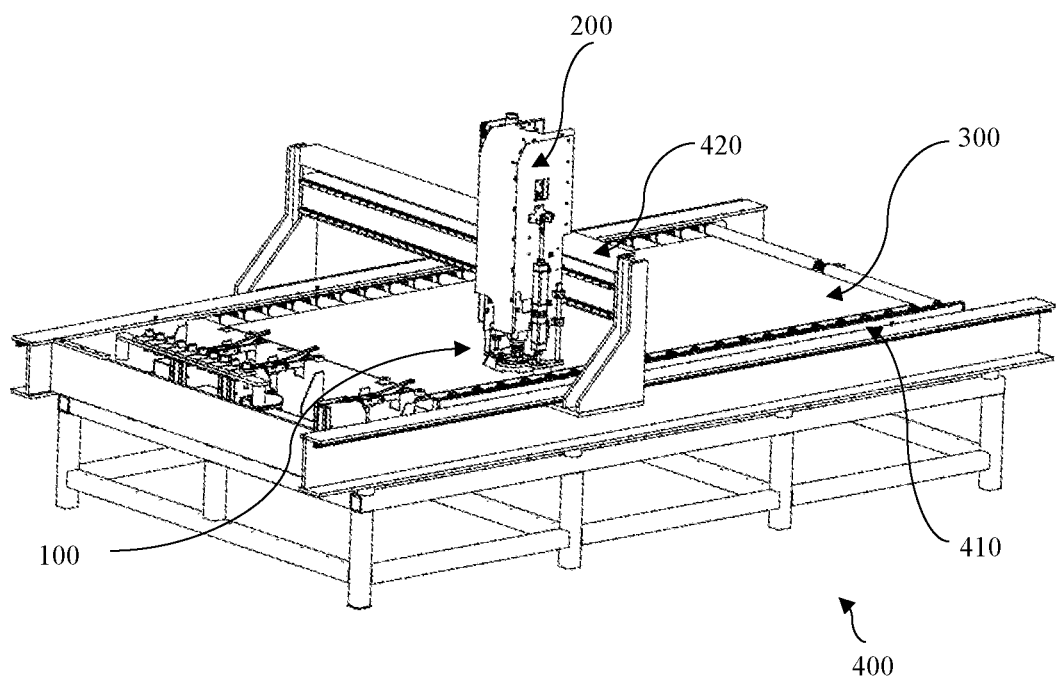
FIG. 4 depicts a schematic perspective view of a machine tool.

FIG. 4 shows a schematic perspective view of a machine tool 400 with a machining head 200 for machining a workpiece 300. The fixing device 100 is arranged on the machining head 200. The machining head 200 is arranged on a bridge 420 that can be moved in the X- and Y-directions. Thus, the fixing device 100 travels together with the machining head 200.

The workpiece 300 is mounted on a structure such as a movable table 410. The table 410 supports the workpiece 300 only selectively or in sections. In the area of the machining axis, the fixing device holds or fixes the machining side of the workpiece in position locally despite the absence of support from below. This improves the quality of the machining and reduces the wear on the tool.

Figure 5:
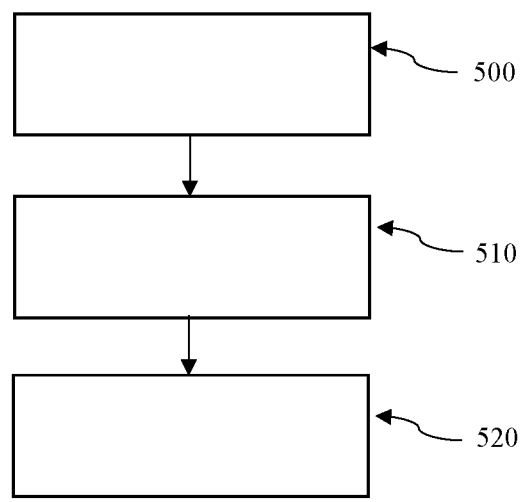
FIG. 5 depicts a flow chart of a method for fixing a workpiece.

FIG. 5 shows a flow chart of a method for fixing a workpiece during machining by a machining head, in particular a drill head, of a machine tool wherein the workpieces are machined from a machining side at a machining point.

In a first step 500, the workpiece is fixed or attached on the machining side of the workpiece and adjacent to the machining point relative to the machining head by means of a fixing device, in particular the fixing device as described above, when a control command is given. The fixing takes place by activating the vacuum holder. The control command can be given by the controller of the machine tool or by the sensor which detects the lowering tool. Thus, the length of the tool can also be detected with a known position in the Z direction. This information can be used, for example, for the maintenance status of the tool, for example to determine the time of replacement of the tool. At least before the activation of the fixing device and the fixing of the workpiece, any dirt that might be present can be extracted or blown away using the suctioning and/or extracting device.

In a second step 510, the workpiece is machined at the machining point by the machining head. During machining, any residues such as shavings can be extracted. In addition, lubricant and/or coolant can be injected to the location of the machining.

In a third step 520, the workpiece is released again when a control command is given. The control command can be given by the controller of the machine tool or by the sensor which detects the raising tool.

These steps can be repeated for further machining steps on the workpiece. Then a movement of the machining head and/or the workpiece takes place between these steps. During the method process, the extracting device can remain activated for the residues created during machining.

The fixing device presented here holds the machining side of the workpiece in the region of the machining axis locally in the absence of support from below. This improves the quality of the machining and reduces the wear on the tool.

The invention claimed is:

1. A method for fixing a workpiece during machining by at least one of a machining head and a drill head of a machine tool, wherein the workpieces are machined from a machining side at a machining point, the method comprising the steps:

fixing the workpiece, relative to the machining head, on the machining side of the workpiece and adjusting the machining point by means of a fixing device comprising:
a fastening device adapted for fastening the fixing device to the machining head;
a fixing head adapted for releasably, locally fixing the workpiece on the machining side thereof and adjacent to the machining point by exerting a holding force which is directed to the fixing device and to the machining head; and a controller configured to control the fixing and releasing of the fixing head on the workpiece, when a control command is given, wherein the fixing is realized by exerting a holding force which is directed to the fixing device and to the machining head;

machining the workpiece at the machining point by the machining head;

removing at least one of dirt and residues resulting from the machining from the machining side of the workpiece by at least one of suctioning and extracting device with at least one compressed air inlet; and releasing the workpiece from the fixing device when a control command is given.

2. The method according to claim 1, wherein the fixing device is configured to apply an attractive force to the machining side of the workpiece to fix the workpiece with its machining side at the fixing head.

3. The method according to claim 1, further comprising the steps of at least one of blowing any dirt away and extracting any dirt away, at least before an activation of the fixing device and the fixing of the workpiece.

4. The method according to claim 1, wherein, at least during machining, residues occurring during machining are extracted and/or lubricant and/or coolant is injected.

5. The method according claim 1, further comprising the steps of detecting the presence of a tool by means of a sensor.

* * * * *